United States Patent

Skierszkan et al.

[19]

[11] Patent Number: 5,818,834
[45] Date of Patent: Oct. 6, 1998

[54] SERIAL BIT RATE CONVERTER EMBEDDED IN A SWITCHING MATRIX

[75] Inventors: Simon Skierszkan; Jim Lehmann, both of Kanata, Canada

[73] Assignee: Mitel Corporation, Kanata, Canada

[21] Appl. No.: 581,580

[22] PCT Filed: Jul. 13, 1994

[86] PCT No.: PCT/CA94/00377

§ 371 Date: Mar. 11, 1996

§ 102(e) Date: Mar. 11, 1996

[87] PCT Pub. No.: WO95/02951

PCT Pub. Date: Jan. 26, 1995

[30] Foreign Application Priority Data

Jul. 16, 1993 [CA] Canada ................................ 2100729

[51] Int. Cl.[6] ............................................... H04L 12/56
[52] U.S. Cl. ........................ 370/366; 370/391; 370/536; 341/61
[58] Field of Search ................................ 370/366, 536, 370/537, 538, 391; 341/61

[56] References Cited

U.S. PATENT DOCUMENTS 5,337,181  8/1994  Rogers ..................................... 370/366
5,343,467  8/1994  Wohr ....................................... 370/366
5,359,605  10/1994 Urbansky et al. ....................... 370/366
5,471,466  11/1995 Cooperman ............................. 370/366

*Primary Examiner*—Melvin Marcelo
*Assistant Examiner*—Chiho Andrew Lee
*Attorney, Agent, or Firm*—Marks & Clerk

[57] ABSTRACT

A time division switching matrix capable of effecting rate conversion comprises a plurality of serial inputs for connection to respective serial input links, each capable of carrying time division multiplexed PCM channels, a plurality of serial outputs for connection to respective serial output links, each capable of carrying time division multiplexed PCM channels, and a serial-to-parallel converter associated with each input for converting a serial input stream to parallel format, each said serial-to-parallel converter being independently configurable to produce the same net parallel throughput regardless of the bit rate of the associated input link. The serial-to-parallel converters are staggered length shift registers. The output side of the switching matrix can be similarly configured.

4 Claims, 5 Drawing Sheets

SERIAL BIT RATE CONVERTER EMBEDDED IN A SWITCHING MATRIX

This invention relates to a time division switching matrix capable of effecting rate conversion.

Many digital telephone systems are based on the transport of time multiplexed, serialized PCM (pulse coded modulation) encoded voice bytes. PCM is an 8 bit encoding scheme for digitizing an analog voice signal, sampled at 8 khz. Different telephone networks employ different degrees of multiplexing between the bytes flowing serially at a rate of 8 bits per 125 microseconds (the period of 8 khz.). Popular schemes include time division multiplexing of 32 voice channels (for a net data rate of 2.048 megabits per second), 64 voice channels (for 4.096 megabits per second) or 128 voice channels (for 8.192 megabits per second) onto single PCM highways.

Most if not all digital networks require switching between logical channels in the interconnected PCM highways. Hitherto this has been performed with rate conversion circuitry.

FR-A-2,376,572 discloses a typical time division switching matrix including a a circuit capable of multiplexing incoming serial multiplex streams onto a supermultiplex parallel stream. This employs serial-to-parallel and parallel-to-serial converters associated with each input or output respectively. This patent does not, however, suggest any means for effecting rate conversion within the switch.

According to the present invention there is provided a time division switching matrix capable of effecting rate conversion comprising a plurality of serial inputs for connection to respective serial input links, each capable of carrying time division multiplexed PCM channels, a plurality of serial outputs for connection to respective serial output links, each capable of carrying time division multiplexed PCM channels, and a serial-to-parallel converter associated with each input for converting a serial input stream to parallel format. The serial-to-parallel converters are shift registers that are reconfigurable to produce the same net parallel throughput regardless of the bit rate of the associated input link, said shift registers are staggered in length to delay the time at which the input data are ready to be parallel loaded, and for different data rates unique input shift register clocks are provided to properly shift the input data at the desired data rate.

The invention allows for rate conversion in the switching matrix, for example, between PCM highways of 2.048 megabits per second, and 4.096 megabits per second, or 2.048 megabits per second and 8.192 megabits per second. It also allows for conversion from 8.192 megabits per second to 2.048 megabits per second, or 4.096 megabits per second and 2.048 megabits per second. With rate conversion, networks with differing serial backplanes can be interconnected.

In the preferred embodiment, the switching core of the device consists of a ram based time switch that switches 256×256 channel locations. During each 125 microsecond frame 256 bytes of incoming PCM data are written in sequence into a data ram. During the frame, 256 reads of the same memory fetch PCM data bytes, which are shifted out onto serial output links. The time at which the fetch occurs determines the output link and channel number that the PCM data is to be routed to.

The invention will now be described in more detail, by way of example only, with reference to the accompanying drawings, in which.

Figure 9:
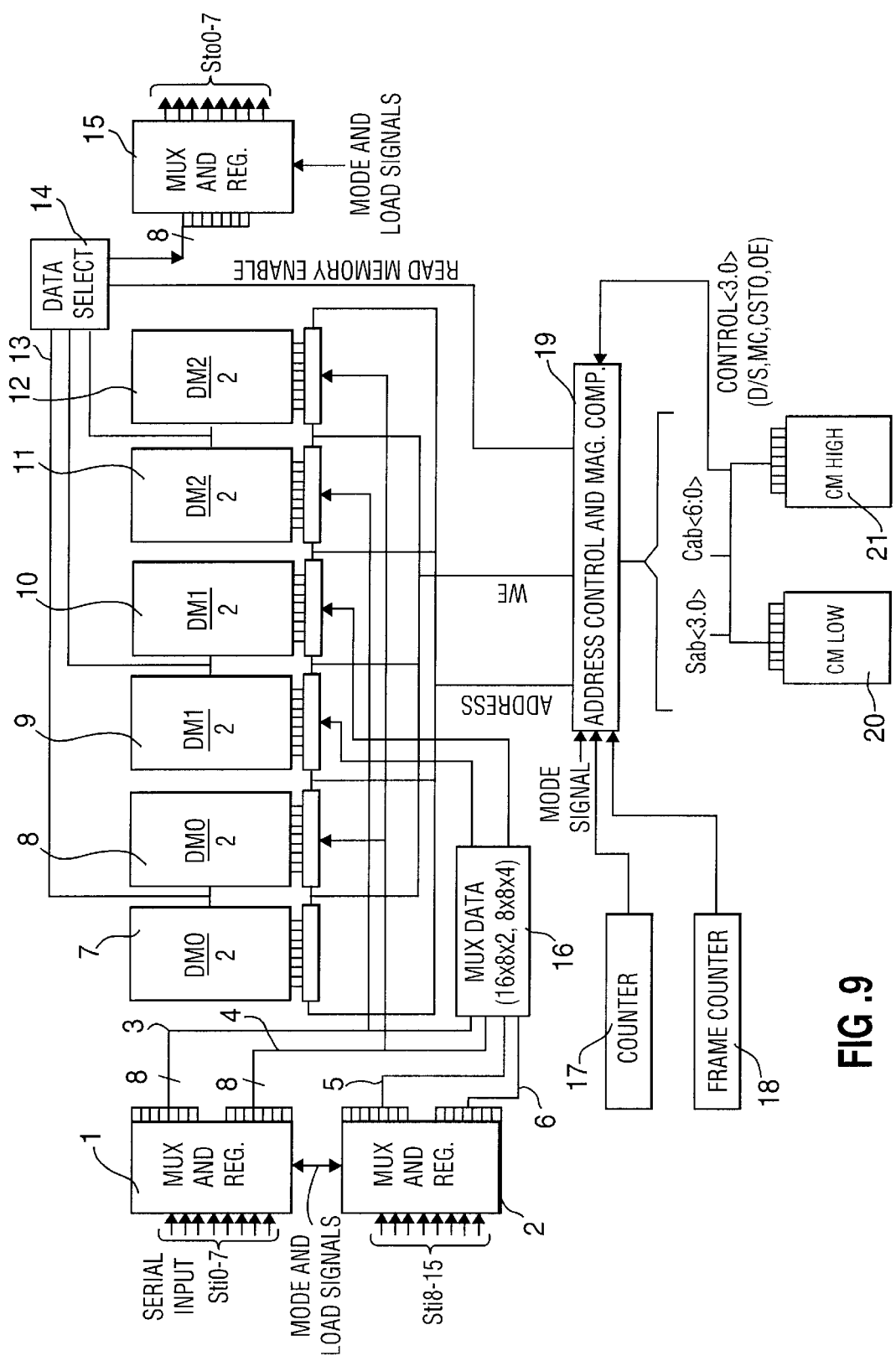
FIG. 9 is a block diagram of a switching matrix in accordance with the invention.

The switching matrix shown in FIG. 9 comprises input Mux 1, 2 each containing reconfigurable shift registers and producing 8 bit parallel output on input buses 3, 4, 5, 6 connected directly to memories 7, 8, 11, 12, and through Mux 16 to memories 9,10. The memories are in turn are connected to parallel output buses 13. Output buses 13 are connected through data select switch 14 to output Mux 15, which is connected to eight serial output links.

The switch also includes a counter 17, a frame counter 18, an address control unit 19, and low and high memories 20, 21.

At 2.048 megabits per second input and output, the switching matrix can switch between 8 physical input links with 32 time multiplexed PCM channels and 8 output links with 32 channels. As the speed of the input (output) data rate is increased, the number of input (output) is reduced by half, and the number of channels in the active links double. The switching memory always operates with a nominal 244 nanosecond cycle time.

Figure 1:
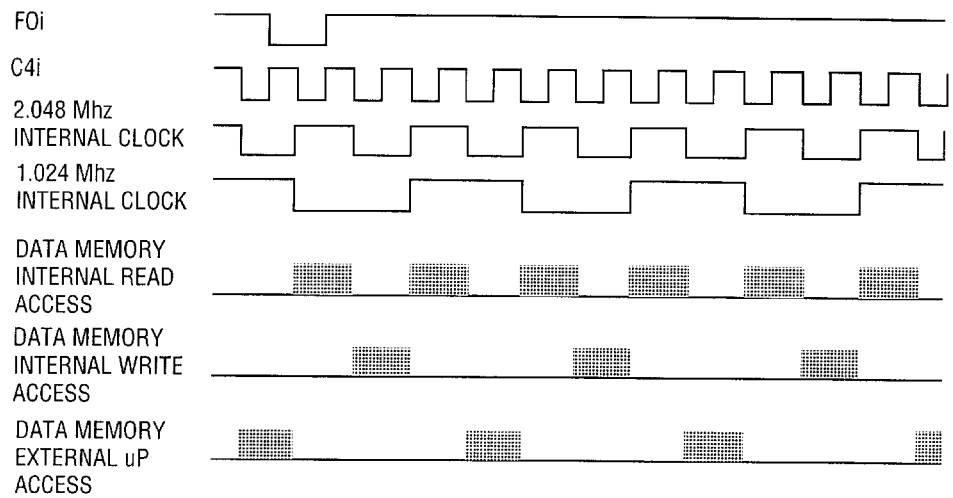
FIG. 1 is a diagram showing the memory address timing for a switching matrix in accordance with the invention.

The multiplexing of the data memory accesses is depicted in FIG. 1, in which Foi is an 8 khz framing pulse and C4i is a 4.096 Mhz clock that clocks the operation of the memories Data memory writes are doubled up, i.e. 2 PCM bytes from the serial input are written in parallel to free up clock cycles for time multiplexed memory accesses.

Within this framework of accesses to the switching matrix core, incoming serial data is converted into a parallel format in sequence, to allow for 128 writes, of two bytes each, to be performed. This is accomplished by providing input shift registers that can be reconfigured to produce the same net parallel throughput independently of the serial bit rate of the input links. There are 8 serial input links available for input at 2.048 megabits per second operation. At 4.096 megabits per second only the first 4 are used, and at 8.192 megabits per second, only the first 2 are used. Blocking modes are also available that allow the use of more inputs.

Figure 2:
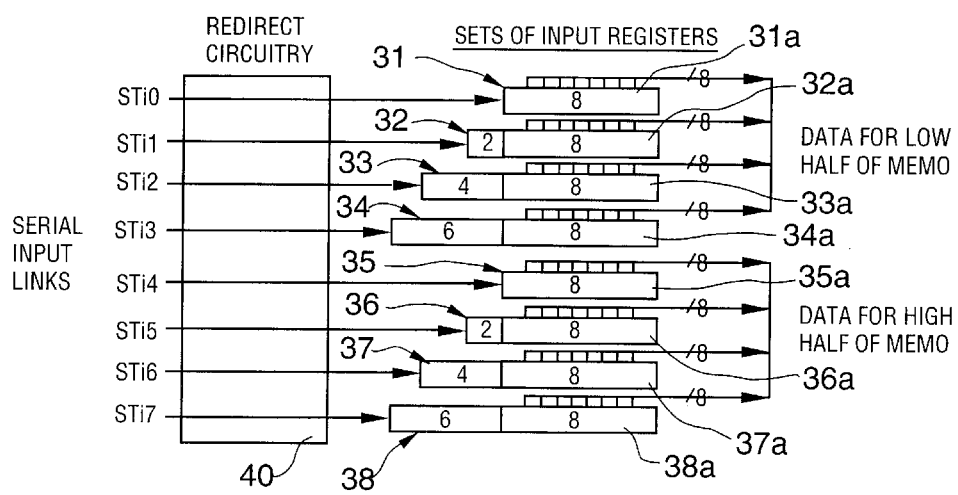
FIG. 2 is a diagram showing the inputs shift registers for the 2 Mb/s mode.

The base input configuration, as used in the 2.048 megabit per second input data rate is shown in FIG. 2, which shows serial inputs streams STi0–STi7 input through redirect circuit 40 to a staggered length set of input shift registers 31–38. These are followed by a set of 8 tristateable latches with parallel data taps 31a–38a. By staggering the length of the input shift registers, the time at which the input data is ready to be parallel loaded can be effectively delayed, (i.e. when the output latches are enabled) in turn, from each latch set. The timing of this scheme is such that input stream 0&4 are written to data memory first, followed in sequence by 1&5, 2&6 and 3&7, all in two 8 bit byte parallel format. This sequence is evident by the increasing length, and hence the time delay, associated with the ascending input stream pairs. The parallel data is written to the low (MSB=0) and high (MSB=1) halves of the data memory, allowing the use of only four write cycles in one internal channel cycle, based on the internal timing shown in FIG. 1.

Figure 3:
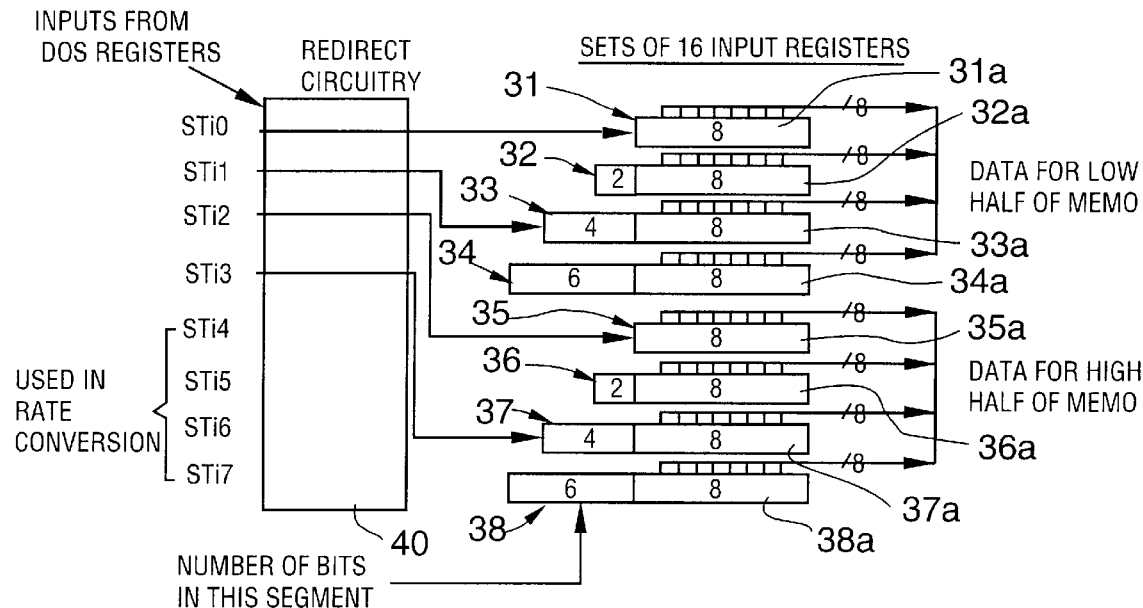
FIG. 3 shows the input data stream redirects for the 4 Mb/s mode.

With input data at 4 megabits per second, the circuit operates without changing the base set of input registers seen in FIG. 2, and within the constraints of the internal data memory write and read cycle timing as shown in FIG. 1. This is accomplished by redirecting the input streams to new sets of input latches, with the proper number of delay registers to align them with the internal enable/write timing pulses. This redirection for the 4 megabits per second mode is shown in FIG. 3. The input stream STiO continues into the first set of latches, while the input stream STi1 is redirected down one set, the input stream STi2 is redirected down two sets, and the input stream STi3 is redirected down three sets. This allows the data memory write cycles to remain in the same spot in the overall timing scheme, with only a minor modification to the coding of the input load pulses themselves. Instead of loading in an ascending pair sequence, the data is loaded from input latch sets 0&4, and then from 2&6 in a repeating sequence. Within a single internal 3.91 microsecond channel (32 of these in an internal 125 microsecond frame) there are 4 internal write cycles, but now the write data are loaded from latch sets 0&4 and 2&6 twice each, in the sequence 0&4, 2&6, 0&4, 2&6. This necessitates a retiming of the output enable strobes of the input registers.

Figure 4:
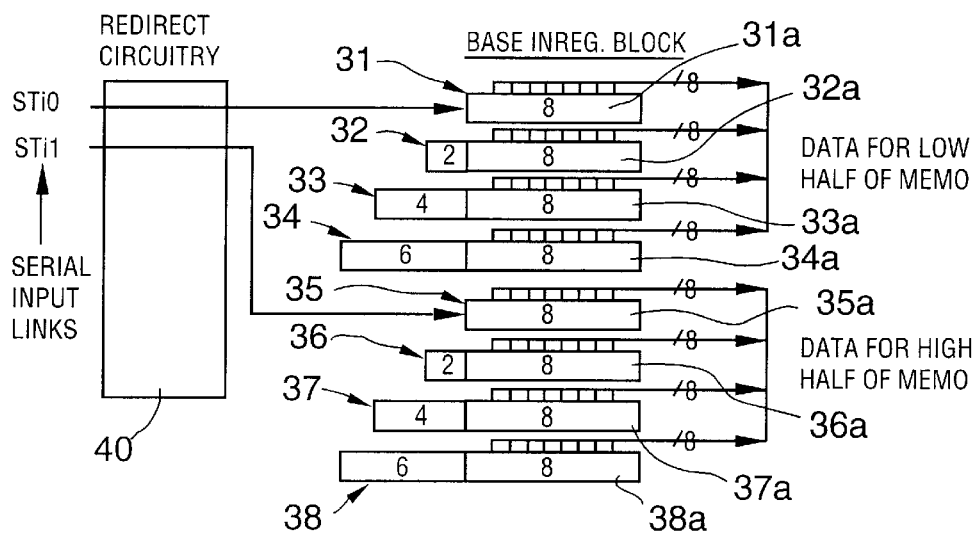
FIG. 4 shows the input data stream redirects for 8 Mb/s mode.

Referring now to FIG. 4, for an 8 megabits per second input mode, only two input links are used, and these are redirected. The internal memory timing must be kept consistent, and the way the input data is latched and loaded adjusted to compensate for the change in serial input data rate. By redirecting the input stream to the latch set 4, load latch sets 0&4 can be parallel loaded repeatedly (4 times per internal channel) and thereby the 8 megabits per second incoming data accommodated, with a consistent internal timing structure. The loading sequence is simply a repetition of 0&4, 0&4, 0&4, 0&4 for one internal 3.91 microsecond channel. Of course, for all of these different modes, unique input shift register clocks must be generated to properly shift the input data at the desired data rate.

Figure 5:
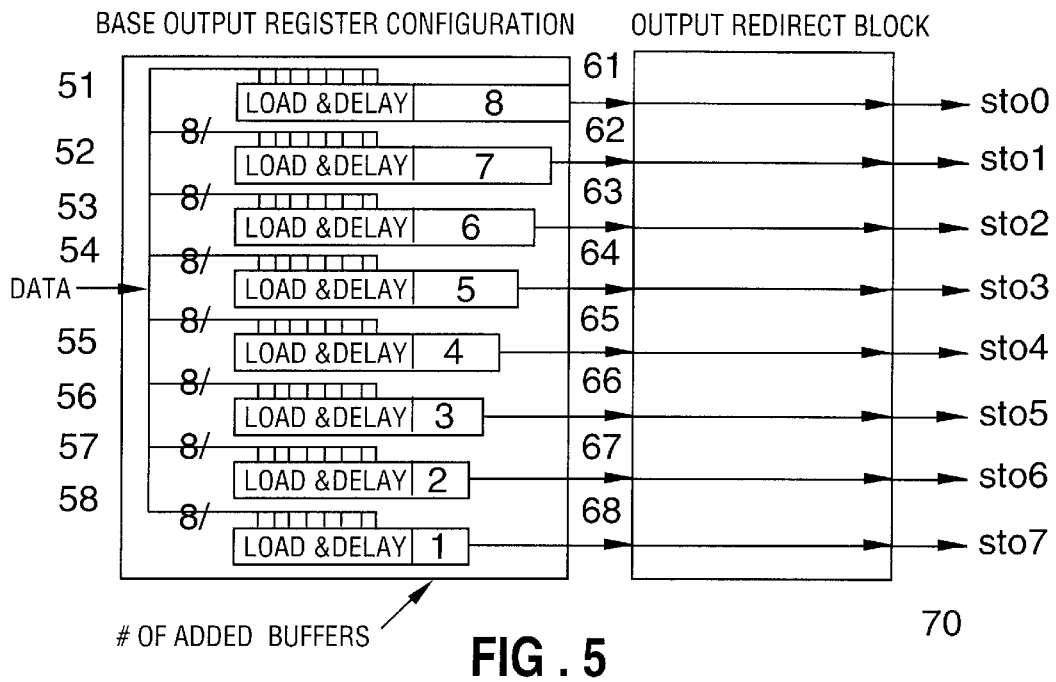
FIG. 5 shows the 2 Mb/s configuration.

The output latch sets undergo a similar mapping strategy to accommodate the variable output rates in both standard and rate conversion modes. The output loads also base their timing on the internal data memory timing cycle seen in FIG. 1, with 8 output register loads in one internal channel. These occur during the period labeled "data memory internal read accesses" in FIG. 1. With 32 internal channels in one frame, and 8 output loads per channel, the desired 256 bytes of output data are achieved in one 125 microsecond frame. The base 2 megabit per second output configuration is seen in FIG. 5. The output register sets consist of 8 bit loadable shift registers 51–58 followed by a variable length set of buffer registers. The variable length buffer registers play no part in the base 2 megabits per second mode. For this mode, the data is effectively loaded directly in to the "load & delay" section 51–58 and streams out with no additional delay. The staggered set of output registers are necessary to ensure that the data for each output stream aligns properly with the data stream channel boundary. The output of registers 61–68 passes to output redirect circuit 70, where it emerges as 8 serial output streams STO0–STO-7.

It is evident from the decreasing number of register buffers added to the respective streams, which latch set is loaded first. The base loading sequence is 0,1,2,3,4,5,6,7, with the additional buffers delaying the channels that were loaded earlier, to force alignment with the output channel boundary.

Figure 6:
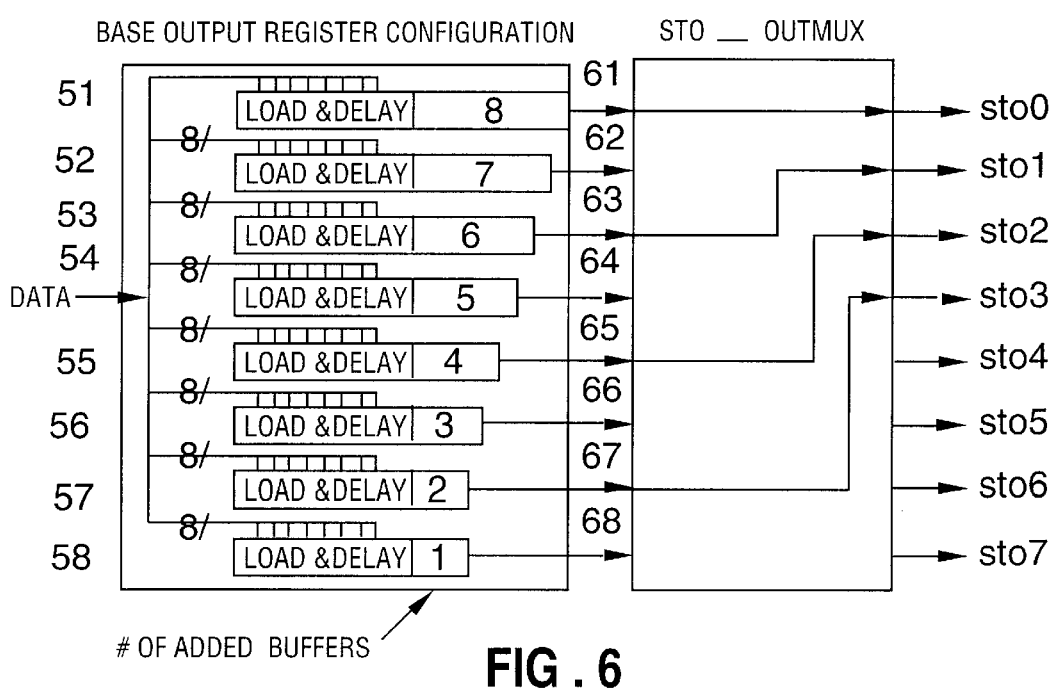
FIG. 6 shows the output data stream redirects for the 4 Mb/s mode.

In 4 megabits per second output operation, shown in FIG. 6, with external serial 8 bit channel times of 1.95 microseconds (8×244 nanoseconds), extra delay elements are introduced in the "load & delay" block. The buffer registers are necessary to align the output channel data with the external output channel boundaries, consistent with the internal data memory read timing. For 4 megabits per second mode, the output data streams are delayed by eight additional 4.096 Mhz output shift clock cycles, aligning the data with the external output channel timing. In addition, the data streams are redirected as necessary to align each loaded PCM byte to its respective link and channel boundary. The same internal load pulses are used, but the load enables are modified to load each latch set twice in one internal 3.91 microsecond channel. The load sequence is 0,2,4,6,0,2,4,6. This accommodates the 4 megabits per second output data rate while allowing the internal memory access and shift register load pulse timing to remain unchanged.

For an 8 megabits per second output mode (FIG. 8), a similar reconfiguration occurs. In order to align the outgoing data streams with the internal cycle timing, delay the loaded output data must be delayed by twenty-four additional 8.192 Mhz output shift clocks by default, instead of the 8 output clock cycles for the 4 megabits per second mode. The reasons for this are apparent from an inspection of FIG. 7. The output streams must be delayed by the appropriate number of additional cycles to align with the channel boundary. This is achieved by loading output latch sets 1 and 5, and redirecting the resulting data streams. The output load sequence in one internal channel is 1,5,1,5,1,5,1,5. This allows the 8 megabits per second data rate on the two output streams to be met within the constraints of the internal timing cycle.

Figure 7:
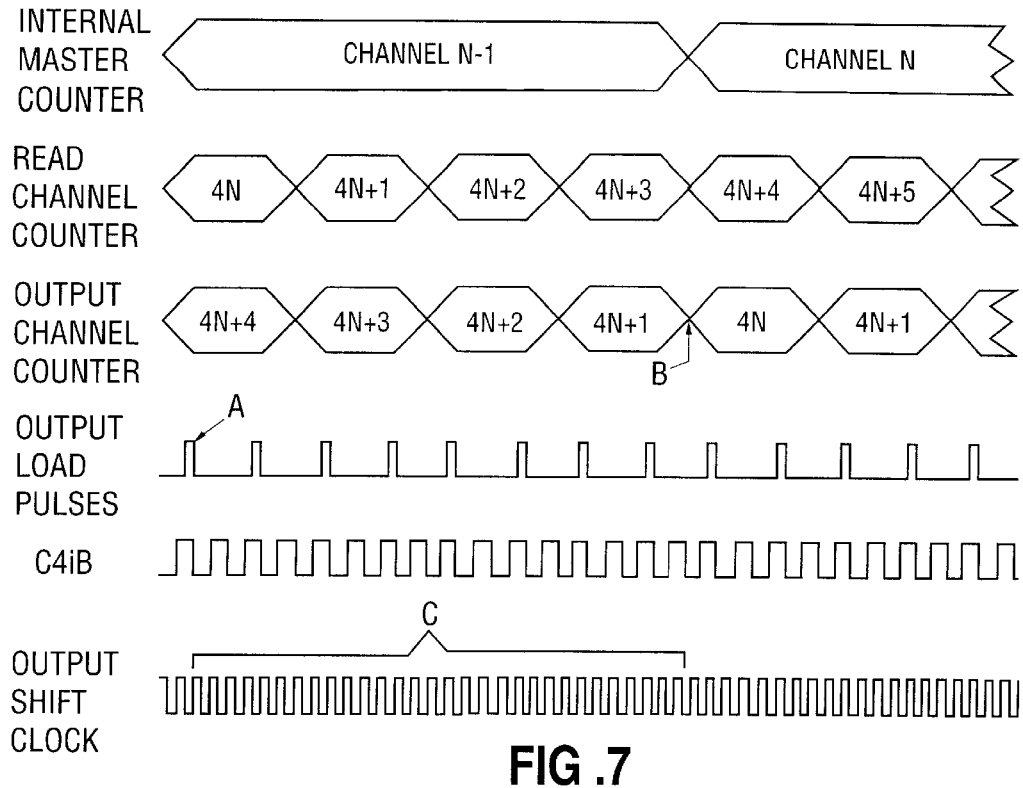
FIG. 7 shows the 8 Mb/s timing.
Figure 8:
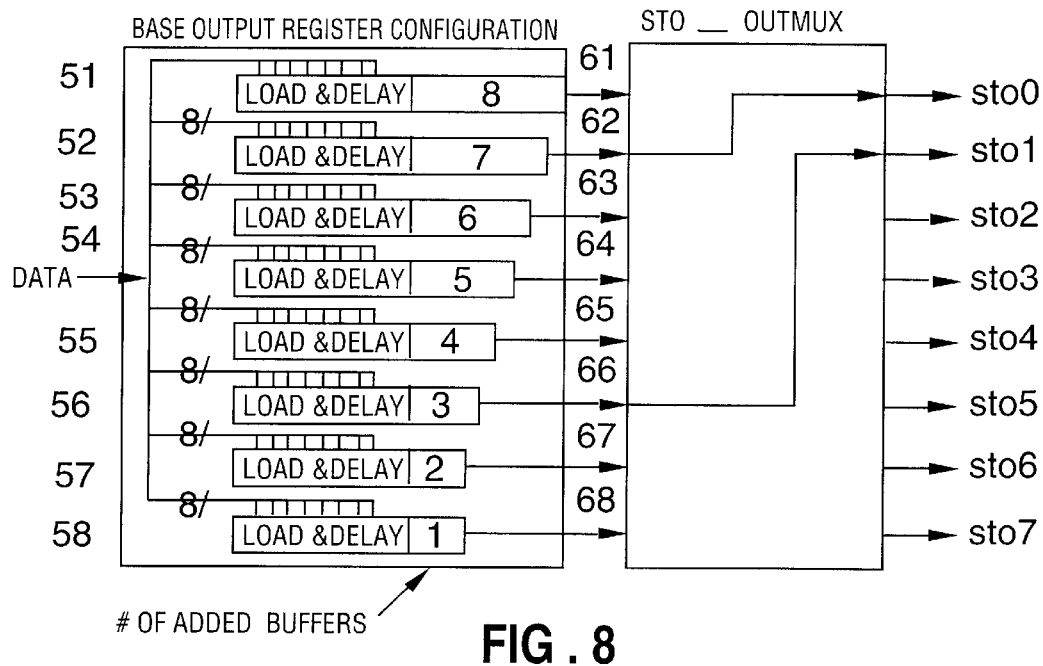
FIG. 8 shows the output data stream redirects for the 8 Mb/s mode.

As shown in FIG. 7, STO0, channel 4N is loaded at point A, but it cannot come out until point B. This time is shown by the bracket C in the output shift vclock stream. Consequently, 7+24=31 buffer flip-flops must be added for alignment, which is why STI0 is redirected to latch set 1 instead of 0.

It is important to note that the architecture of the design allows for independence between the input and output modes. The input write addressing is based solely on the internal timing, with a variable addressing structure converting the connect memory contents to the appropriate address for output data reads. As well, the connect memory addressing is dependent only on the output mode, and is automatically adjusted to compensate for the selected output mode. In this way, the input and output modes are essentially independent, and so are easily reconfigurable around the internal timing, to make backplane as well as rate conversion modes possible. The architecture is also easily extensible, with the simple addition of a new input and output mode decoding, and a slight modification to the load timing circuitry.

We claim:

1. A time division switching matrix capable of effecting rate conversion comprising a plurality of serial inputs for connection to respective serial input links, each capable of carrying time division multiplexed PCM channels, a plurality of serial outputs for connection to respective serial output links, each capable of carrying time division multiplexed PCM channels, and a serial-to-parallel converter associated with each input for converting a serial input stream to parallel format, characterized in that said serial-to-parallel converters are shift registers that are reconfigurable to produce the same net parallel throughput regardless of the bit rate of the associated input link, said shift registers are staggered in length to delay the time at which the input data are ready to be parallel loaded, and for different data rates unique input shift register clocks are provided to properly shift the input data at the desired data rate.

2. A time division switching matrix as claimed in claim 1, characterized in that redirecting means are provided for redirecting the input serial data streams to different shift registers with the required number of delay registers so as to align the input streams with internal enable/write timing pulses.

3. A time division switching matrix as claimed in claim 1, characterized in that it further comprises a parallel-to-serial converter associated with each output for converting a parallel input stream to serial format for application to the associated output link, said parallel-to-serial converters being independently reconfigurable to permit the same net parallel throughput regardless of the bit rate of the output links.

4. A time division switching matrix as claimed in claim 3, characterized in that the parallel-to-serial converters comprise shift registers that are staggered in length.

* * * * *